United States Patent

Audagnotto et al.

Patent Number: 5,859,426
Date of Patent: Jan. 12, 1999

[54] DEVICE FOR GAUGING RELATIVE ROTATIONAL DISPLACEMENT AND/OR SPEED BETWEEN THE RACES OF A ROLLING CONTACT BEARING

[75] Inventors: Paolo Audagnotto; Mario Micca, both of Turin, Italy

[73] Assignee: SKF Industrie S.P.A.

[21] Appl. No.: 780,540

[22] Filed: Jan. 9, 1997

[30] Foreign Application Priority Data

Jan. 18, 1996 [IT] Italy .................. TO96A0023

[51] Int. Cl.⁶ ................................ G01D 5/34
[52] U.S. Cl. .................. 250/231.13; 250/231.18
[58] Field of Search .............. 250/231.13, 231.15, 250/231.18, 231.14; 356/373, 375, 356

[56] References Cited

U.S. PATENT DOCUMENTS

| 4,797,549 | 1/1989 | Ho et al. ...................... 250/227 |
| 4,899,048 | 2/1990 | Shelander .................. 250/231.13 |
| 5,038,031 | 8/1991 | Kurosawa et al. ........... 250/231.14 |

FOREIGN PATENT DOCUMENTS

| 657 738 | 6/1995 | European Pat. Off. . |
| 2 343 254 | 9/1977 | France . |
| 25 05 802 | 8/1976 | Germany . |
| 2 197 108 | 5/1988 | United Kingdom . |

*Primary Examiner*—Que T. Le
*Attorney, Agent, or Firm*—Merchant, Gould, Smith, Edell, Welter & Schmidt

[57] ABSTRACT

A device for gauging relative rotational movement and/or displacement between the races (10, 11) of a bearing comprises a pulse generator (13) activated by the rotating race (11) and coupled to a non-rotating sensor (12). The pulse generator consists of a coding wheel and the sensor consists of an optical encoder. The coding wheel (13) comprises a disk of reflecting material on which a plurality of non-reflecting zones or apertures is provided.

6 Claims, 3 Drawing Sheets

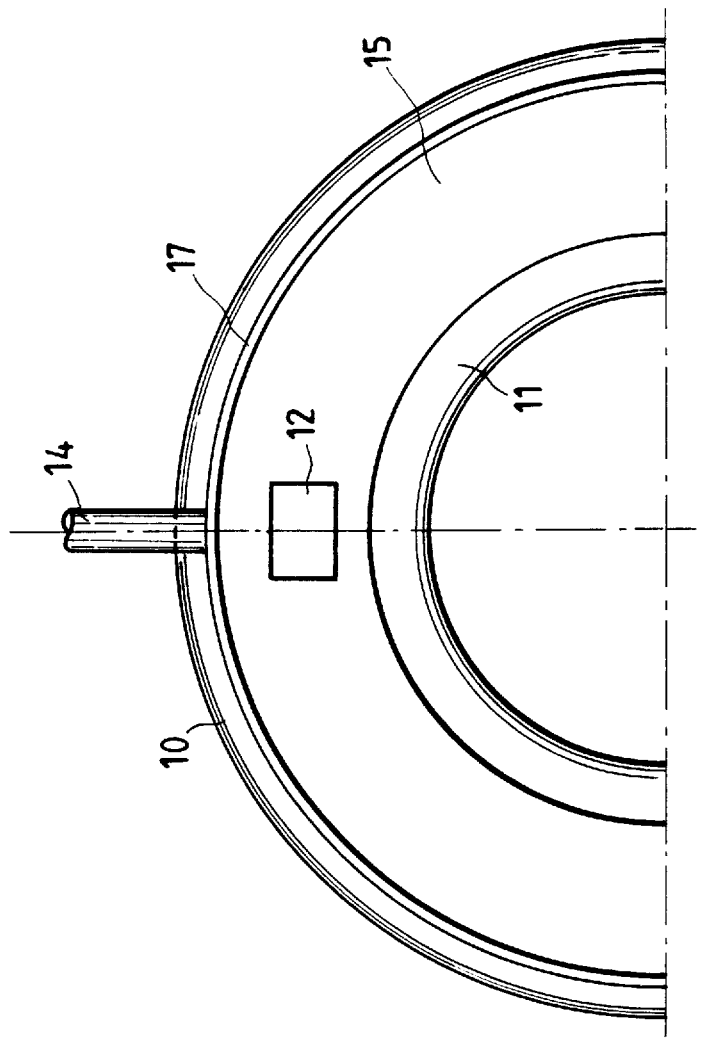
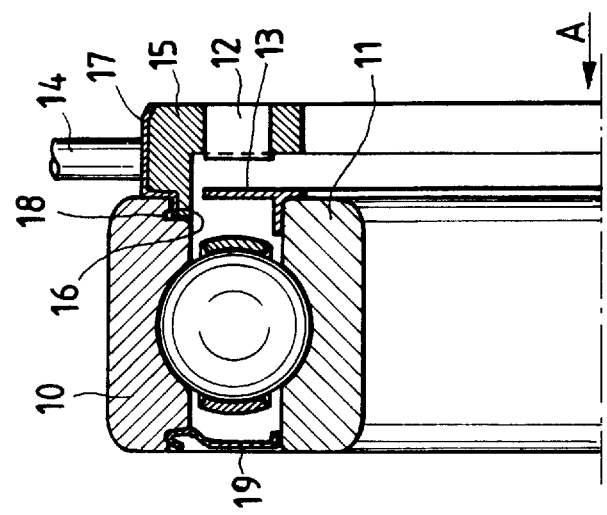

DEVICE FOR GAUGING RELATIVE ROTATIONAL DISPLACEMENT AND/OR SPEED BETWEEN THE RACES OF A ROLLING CONTACT BEARING

FIELD OF THE INVENTION

The present invention falls within the field of devices for gauging relative angular displacement and/or relative revolving speed between two relatively rotating members. More particularly, the invention relates to an optical device for sensing relative angular displacement and/or rotation between the races of a rolling contact bearing.

BACKGROUND OF THE INVENTION

At present there are known rolling contact bearings having a gauging device which supplies a signal carrying information as to movement and/or position of one of the two races of a bearing relative to the other one. Such gauging devices are comprised of a moving pulse generator and a stationary sensor. The pulse generator member, known in the field as impulse ring, is fixed for rotation with the rotating race of the bearing. The pulse generator is usually a toothed or magnetized ring mounted to the member to be kept under control. The sensor, which is usually a Hall effect sensor, is installed onto a fixed part so as to operatively face the toothed or magnetized portion of the impulse ring, near to it or at a preset distance therefrom.

Although the above cited devices give satisfactory performances, they have a limit concerning the rate of pulses per revolution they are able to supply. This turns out to be a limit to the number and/or kind of information available by means of that particular kind of gauging device.

Another inconvenience encountered with known kinds of gauging devices is that dirt which inevitably tends to deposit on their components may jeopardize correct operation thereof over time. Furthermore, these devices are not suited to work under high temperature conditions, whereby they cannot be used for some applications.

In addition, for example where the bearing is applied to the wheel hub of a vehicle, the high magnetic fields generated by a conventional gauging device will attract metal particles from the vehicle brakes with the result that these particles will accumulate on the bearing.

A further drawback lies in that magnetic impulse rings and Hall effect sensors are rather costly.

SUMMARY OF THE INVENTION

It is an object of the present invention to provide a device capable of overcoming the above prior art drawbacks and limits. Particularly, it is an object of the present invention to provide a versatile, inexpensive device capable of being utilized with a number of different applications.

In accordance with one aspect of the invention as claimed, these objects are accomplished by the provision of a device for gauging relative rotational movement and/or displacement between the races of a bearing of the type comprising pulse generator means activated by the rotating race and coupled to non-rotating sensor means, wherein said pulse generator means consists of a coding wheel ant said sensor means consists of an optical encoder.

BRIEF DESCRIPTION OF THE DRAWINGS

In order that the present invention may be well understood there will now be described a few preferred embodiments thereof, given by way of example, reference being made to the accompanying drawings, in which:

FIG. 1A is a partial axial cross-sectional view of a first embodiment of the device of this invention;

FIG. 1B is a front as indicated by arrow A of FIG. 1;

DETAILED DESCRIPTION OF PREFERRED EMBODIMENTS

Figure 2:
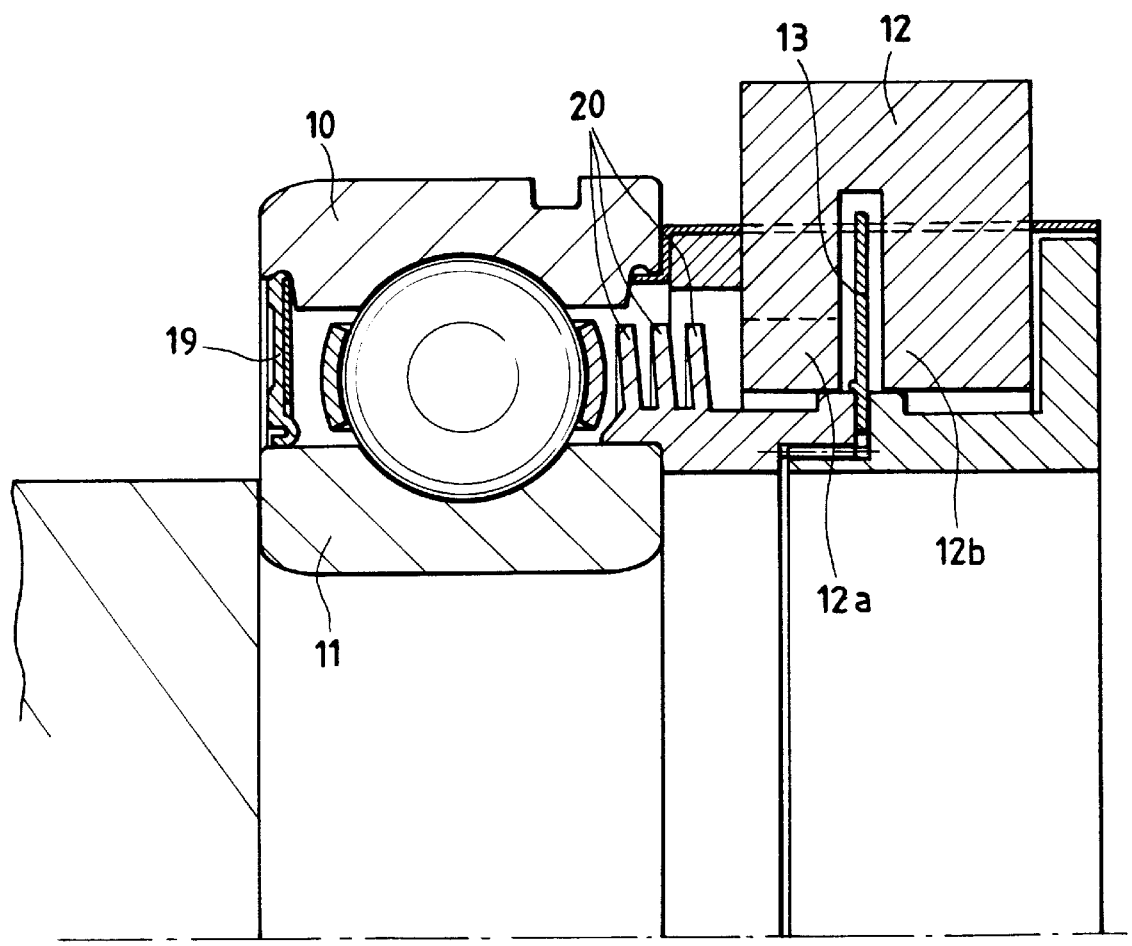
FIG. 2 is a plan view of the apparatus of FIG. 1.

With reference initially to FIGS. 1A and 1B, numerals 10 and 11 designate the outer, non-rotating race and the inner, rotating race of a rolling contact bearing, respectively. According to the present invention, mounted to the outer stationary race 10 is a gauging sensor comprising an optical encoder 12 operatively facing a coding wheel fixed for rotation with the inner rotating race 11. The optical encoder 12 comprises a photoelectric device which sends a beam of light to the coding wheel 13 and receives the beam of light reflected by said coding wheel. Coding wheel 13 is a disc of light reflecting material in which a plurality of windows or other non-reflecting zones is obtained. As the wheel rotates, these zones interrupt continuously the reflected beam, thereby generating information concerning the position of the coding wheel. The photoelectric device 12 processes this information in corresponding digital data which are transmitted through a cable 14 to a remote data processing unit (not shown).

In the example of FIGS. 1A and 1B, the optical encoder 12 is seated in a mounting ring member 15 supported by bending the edge 16 of a metal insert 17. Metal insert 17 is fixed in a groove 18 of the non-rotating race. Groove 18 is generally provided in conventional bearing races for mounting shields and other sealing members such as the one designated at 19 on the opposite side of the bearing (FIG. 1A).

Referring to the variant embodiment of FIG. 2, the body of the optical encoder 12 is constructed in bridge-like manner providing two branch portions 12a, 12b in which there are respectively located a light beam emitter (not shown for simplicity) and a receiver (not shown) for picking up directly the beam coming form the emitter. A window-type of coding wheel 13 is operatively interposed between the emitting and the receiving parts so as to cause continuous interruption of the luminous signal directed from the emitter to the receiver, in similar manner as disclosed with reference to the variant of FIGS. 1A and 1B.

In the embodiment of FIG. 2, there is provided a labyrinth type of sealing device 20 mounted to the inner rotating race 11. Sealing device 20 has the purpose of preventing grease and/or other polluting elements from reaching the optical gauging device.

Figure 3:
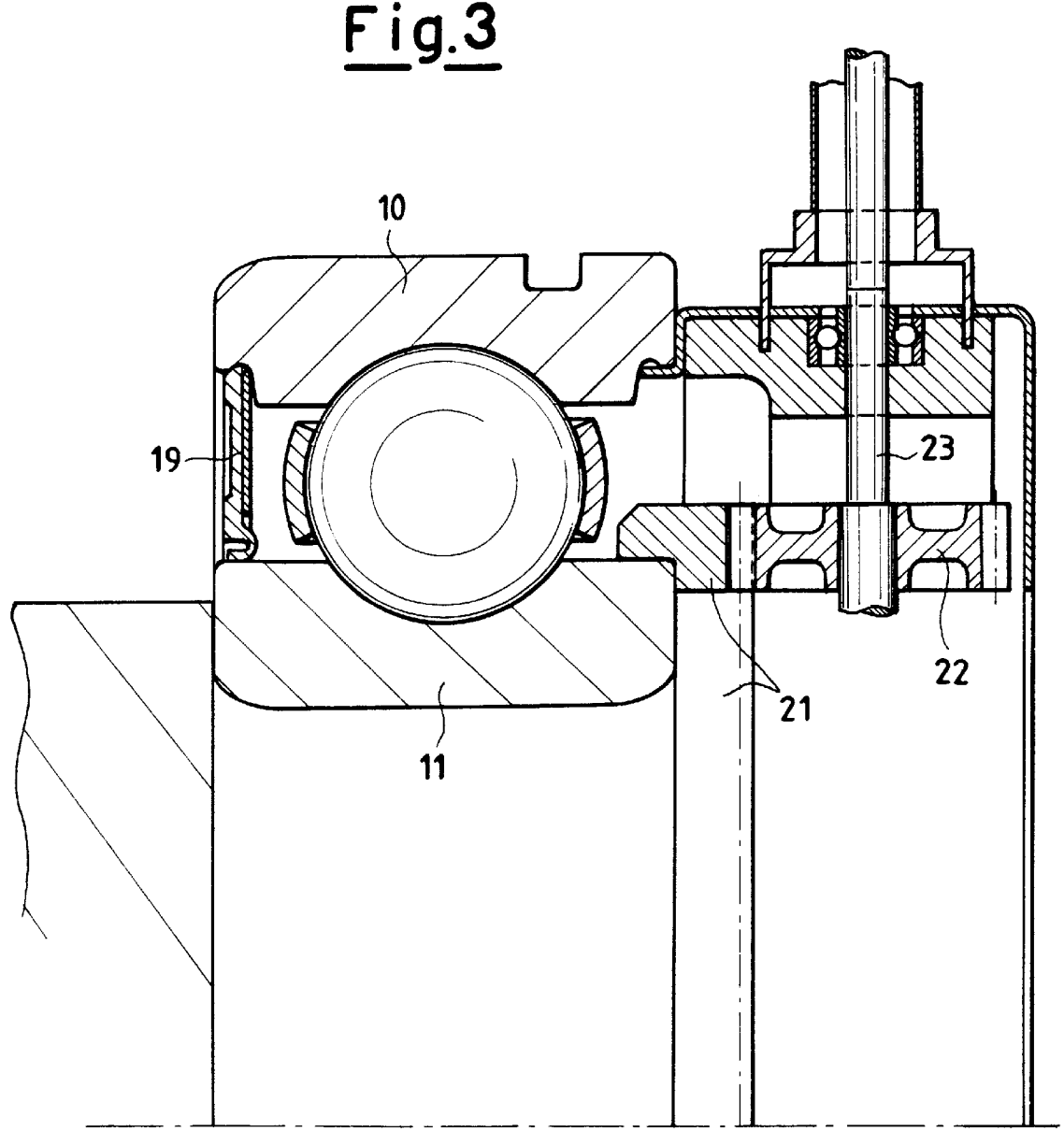
FIG. 3 is a partial axial cross-sectional view of a second embodiment of the device of this invention, respectively.

Referring now to FIG. 3, in accordance with a further variant embodiment of the present invention a toothed crown 21 is fixed for rotation with the inner rotating race 11. Toothed crown 21 engages a gear 22 rotating in a plane substantially perpendicular to that of crown 21. Gear 22 rotationally drives a flexible shaft 23 the far end of which (not shown) rotates a remote coding wheel coupled to an optical encoder, in similar manner as discussed hereinabove with reference to the previous drawings. This embodiment is particularly well suited to be applied to bearings working in an adverse environment, e.g. under high temperature conditions, that would tend to damage the optical gauging device. For example, the arrangement of FIG. 3 would be adapt to a bearing in contact with the hot motor oil of the gearbox.

It will be appreciated that the application of an optical sensor gauging device to rolling contact bearings allows to increase the rate of pulses attained in each revolution, up to 2048 pulses per revolution. Also, further information concerning the position, the speed and other important parameters of space as a function of time can be attained by improving the resolution, as provided by this invention.

Moreover, this kind of sensor is scarcely influenced by the presence of dirt, whereby it is ideal for a number of applications that have heretofore not been possible due to the adverse affection caused by dirt or high temperature. In this latter event, the problem is solved by the embodiment shown in FIG. 3.

Furthermore, the device of this invention allows considerable saving of costs owing to the provision of a commercially available and reliable kind of optical sensor.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing example.

The disclosures in Italian patent application No. T096A000023 from which this application claims priority, and in the abstract accompanying this application are incorporated herein by reference.

We claim:

1. A device for gauging relative rotational movement and/or displacement between races of a bearing, wherein the bearing comprising:

a rotating race with a pulse generator means activated by the rotating race; and a non-rotating race with a non-rotating sensor means mounted to the non-rotating race and coupled to the pulse generator means;

wherein said pulse generator means consists of a coding wheel mounted to the rotating race of the bearing and said sensor means consists of an optical encoder.

2. A gauging device as claimed in claim 1, characterized in that the coding wheel (13) comprises a disk of reflecting material on which a plurality of non-reflecting zones is provided, the optical encoder (12) comprising emitter means adapted to send a beam of light on said coding wheel and photoelectric means adapted for receiving the beam of light reflected by said coding wheel.

3. A gauging device as claimed in claim 2, characterized in that said non-reflecting zones consists of apertures.

4. A gauging device as claimed in claim 1, characterized in that the coding wheel (13) is provided with apertures, said coding wheel being interposed between light emitter means and photoelectric means for picking up the light passing directly through said apertures in said wheel.

5. A gauging device as claimed in claim 1, characterized by further comprising a labyrinth sealing device (20) mounted to the inner rotating race (11), said sealing device being arranged so as to prevent dirt and other polluting agents from reaching said optical encoder (12).

6. A gauging device as claimed in claim 1, characterized in that said coding wheel (13) and said optical encoder (12) are located in a position remote from the bearing, said coding wheel being connected to said rotating race (11) of the bearing by flexible rotating driving means.

* * * * *